United States Patent
Tanton et al.

[11] 4,033,670
[45] July 5, 1977

[54] ZEEMAN EFFECT OPTICAL ISOLATOR

[75] Inventors: George A. Tanton; James L. Smith, both of Huntsville, Ala.

[73] Assignee: The United States of America as represented by the Secretary of the Army, Washington, D.C.

[22] Filed: Mar. 3, 1976

[21] Appl. No.: 663,410

[52] U.S. Cl. ............................................. 350/151
[51] Int. Cl.² ........................................... G02F 1/09
[58] Field of Search ................................. 350/151

[56] References Cited
UNITED STATES PATENTS 3,936,748  2/1976  Bomke ........................... 350/151

Primary Examiner—John K. Corbin
Assistant Examiner—Richard A. Rosenberger
Attorney, Agent, or Firm—Nathan Edelberg; Robert P. Gibson; Charles R. Carter

[57] ABSTRACT

An optical isolator for use in a laser system to protect the system from undue absorption of unwanted scattered light energy. The isolator employs the use of a Faraday rotator combined with the application of an external magnetic field to split absorption lines into two components. By adjusting the magnetic field strength light of a certain frequency passes through the rotator at a spectral position between the split absorption line components. Thus absorption is greatly reduced and the plane of polarization will be rotated without introducing ellipticity into the beam polarization.

6 Claims, 3 Drawing Figures

ZEEMAN EFFECT OPTICAL ISOLATOR

DEDICATORY CLAUSE

This invention described herein may be manufactured, used, and licensed by or for the Government for Governmental purposes without the payment to me of any royalties thereon.

BACKGROUND OF THE INVENTION

This invention relates to the field of optical isolators. Faraday rotators are used to protect high energy laser systems from damage due to absorption of unwanted scattered light energy and to transmit information over optical communication links. Bulk Faraday effect rotators currently in use are severely limited by the amount of scattered light energy absorption that they can handle without being damaged. In the case of laser beams, scattered light energy produces extreme heat which is to be absorbed. No rotators are known which can efficiently transmit and isolate laser light of the 10.6 micron order. Also complete isolation is not achieved due to the ellipticity that the rotators induce in the light beam.

SUMMARY OF THE INVENTION

The present invention has provided a solution to overcome the above stated problems as well as an isolator for use with laser light in the 10.6 micron spectral range. Application of an external magnetic field on absorption lines in the rotator shifts the absorption away from the central frequency and in effect splits the line into two components. This feature along with constructing the isolator of materials having large dipole moment has resulted in greater power handling capabilities of the isolator. The capabilities are possible since the absorption is infinitesimally small while the degree of rotation of the polarization plane remains relatively large.

The invention will become more readily apparent from the following detailed description taken in conjunction with the accompanying drawing.

DESCRIPTION OF THE PREFERRED EMBODIMENT

Figure 1:
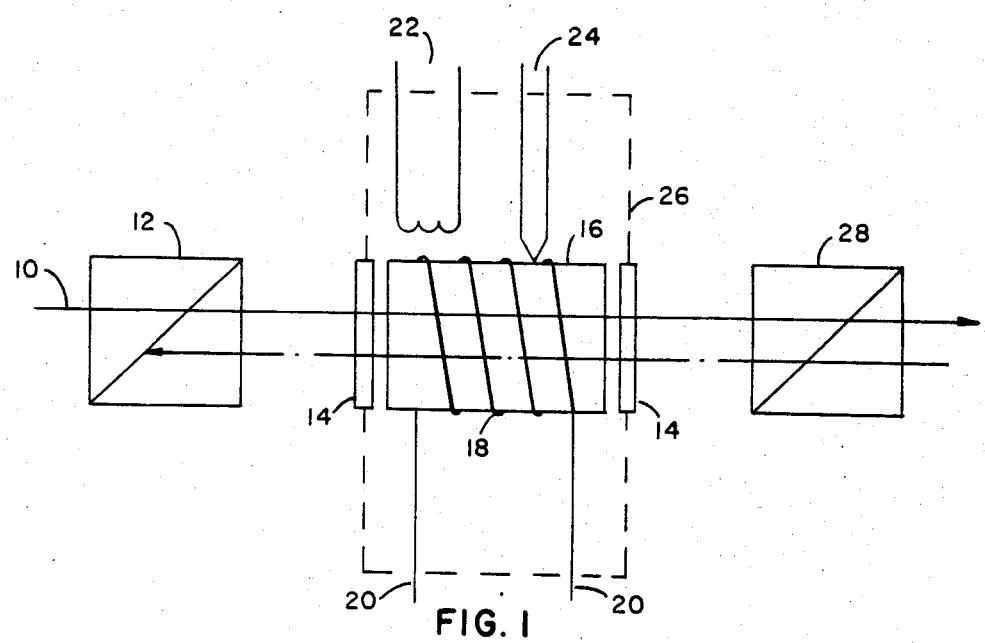
FIG. 1 is a diagrammatic view of a laser system incorporating the device.

As shown in FIG. 1, light of a frequency Eo from an optical source such as a laser generator (not shown) is directed along line 10 from left to right through a polarizer 12. The line is propagated through windows 14 and a Faraday rotator 16. An external magnetic field is produced by a super conducting solenoid 18 that is circumferentially mounted on the rotator 16. The direction of the solenoid magnetic field is parallel to the propagation of the light transmitted. Solenoid coil 18 is connected to a source of electrical energy through conductors 20. An adjustable heater 22 and a thermocouple 24 are provided in the housing 26 to temperature tune and frequency stabilize the material of the rotator. The isolator contains materials that have large dipole moments. Typical materials include, but are not limited to; $CH_3Br$, bromomethane; $CH_3F$, fluoromethane, $CH_3Cl$, chloromethane; $CH_3I$, iodomethane and $CH_2CF_2$, difluoroethylene. After leaving the rotator the light beam propagates through an analyzer 28 which is oriented with its plane of polarization coincident with that of the light beam.

Figure 2A:
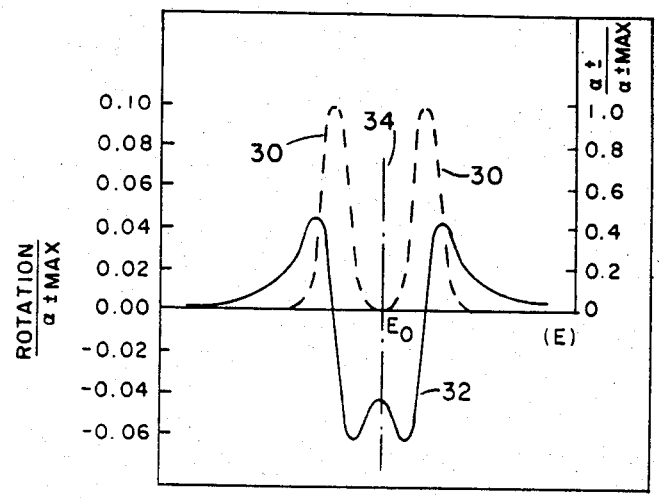
FIGS. 2a and 2b are a graphs of the absorption and rotation due to energy levels in the isolator.
Figure 2B:
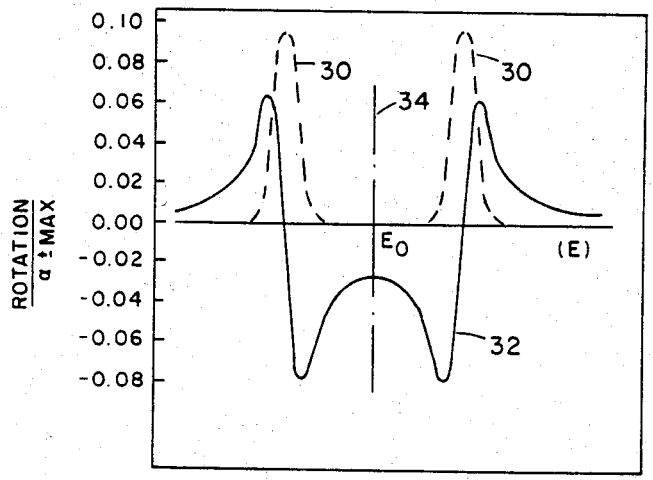

In operation, a laser source provides an emission of radiation and a laser beam is directed along line 10. The beam progresses through the polarizer 12 to the rotator 16. An absorption line in the rotator is split into two components by the application of an external magnetic field from solenoid 18. This Zeeman splitting of the absorption line into the two components is shown by dotted lines 30 on either side of the central frequency EO of the laser beam in FIG. 2a. The strength of the magnetic field is adjusted, depending on the type of material that the rotator is made of, so that light of frequency Eo passes through the rotator at a special position between the split absorption components. This spectral position is shown by a line 34 at Eo in FIGS. 2a and 2b. Thus at this central frequency infinitestimally low absorption will take place and the plane of polarization will be rotated without introducing ellipticity into the beam polarization as shown by solid lines 32, in FIGS. 2a and 2b. While the degree of rotation of the polarization of the laser beam is reduced it remains relatively large and can be increased to cause a 45° rotation by choosing a proper rotator length. FIG. 2b shows the shifting away of the dotted absorption lines due to increase in the strength of the magnetic field but with a loss of polarization rotation.

A light beam will pass from left to right but not in reverse, since light coming from the right in FIG. 1 will be polarized by analyzer 28 at an angle of 45°. After passing through rotator 16 an additional 45° rotation will occur thus a light beam entering from the right will be polarized 90° to polarizer 12 and therefore will not be transmitted through it.

We claim:

1. An optical isolator for use in a laser system having an output in the 10.6 micron or infrared range to protect the system from damage due to unwanted scattered light energy comprising: a housing having windows at each end there for propagation of a laser beam therethrough; an optical rotator disposed between said windows for passing said laser beam between said windows, said rotator containing a material having a large dipole moment; polarizing means disposed for polarization of said beam prior to and following passage of said beam through said optical rotator, means disposed adjacent said rotator to cause an absorption line around 10.6 microns in said rotator to be split into two components wherein the light from said laser passes between said two components, said rotator material having a large dipole moment selected from the group consisting of $CH_3Br$; $CH_3F$; $CH_3Cl$; $CH_3I$ and $CH_2CF_2$, said rotator material exhibiting a high rotation and a small absorption between said two components said absorption line splitting means being a solenoid coil circumferentially surrounding said rotator whereby a magnetic field is produced in said rotator when said coil is energized and a control heater and a thermocouple to maintain frequency stability and tuning of said rotator.

2. An optical isolator as in claim 1 wherein said selected material contained in said rotor is $CH_3Br$.

3. An optical isolater as in claim 1 wherein said selected material contained in said rotor is $CH_3F$.

4. An optical isolator as in claim 1 wherein said selected material contained in said rotor is $CH_3Cl$.

5. An optical isolator as in claim 1 wherein said selected material contained in said rotor is $CH_3I$.

6. An optical isolator as in claim 1 wherein said selected material contained in said rotor is $CH_2CF_2$.

* * * * *